United States Patent
Ripa et al.

(10) Patent No.: US 8,418,129 B1
(45) Date of Patent: Apr. 9, 2013

(54) METHOD FOR AUTOMATICALLY GENERATING CODE TO DEFINE A SYSTEM OF HARDWARE ELEMENTS

(75) Inventors: Alberto Alessandro Della Ripa, Rancho Santa Margarita, CA (US); Peter Benschop, San Juan Capistrano, CA (US); Philip Michael Clovis, San Diego, CA (US); Peter Mark Bouvier, San Diego, CA (US); Steven Dean Michel, Irvine, CA (US); David Dvorman, Santa Ana, CA (US); Diego Escobar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2568 days.

(21) Appl. No.: 10/400,380

(22) Filed: Mar. 26, 2003

Related U.S. Application Data

(63) Continuation-in-part of application No. 10/035,835, filed on Dec. 24, 2001, now Pat. No. 7,020,131, which is a continuation-in-part of application No. 10/029,581, filed on Dec. 20, 2001, now Pat. No. 7,424,013, which is a continuation-in-part of application No. 10/022,673, filed on Dec. 17, 2001, now Pat. No. 7,079,545, which is a continuation-in-part of application No. 10/023,266, filed on Dec. 14, 2001, now abandoned, which is a continuation-in-part of application No. 10/373,139, filed on Feb. 24, 2003.

(51) Int. Cl.
*G06F 9/44* (2006.01)

(52) U.S. Cl. .................................................. 717/106

(58) Field of Classification Search .................. None
See application file for complete search history.

(56) References Cited

U.S. PATENT DOCUMENTS

| | | | |
|---|---|---|---|
| 5,168,570 A | | 12/1992 | Eckert et al. |
| 5,197,016 A | * | 3/1993 | Sugimoto et al. ................. 716/8 |
| 5,231,633 A | | 7/1993 | Hluchyj et al. |
| 5,291,479 A | * | 3/1994 | Vaziri et al. ................... 370/264 |
| 5,422,881 A | | 6/1995 | May et al. |
| 5,572,522 A | | 11/1996 | Calamvokis et al. |
| 5,594,657 A | | 1/1997 | Cantone et al. |
| 5,610,745 A | | 3/1997 | Bennett |
| 5,781,745 A | | 7/1998 | Ramelson et al. |
| 5,815,715 A | * | 9/1998 | Kucukcarkar ................ 717/141 |
| 5,815,716 A | | 9/1998 | Horiguchi |

(Continued)

OTHER PUBLICATIONS

Sotir, John "Stretch Your TDM Network to Meet Next-Generation Needs," Communication Systems Design, Mar. 2003. pp. 27-29.

*Primary Examiner* — Chat Do
*Assistant Examiner* — Jue Wang
(74) *Attorney, Agent, or Firm* — James T. Hagler

(57) ABSTRACT

A method is provided for automatically generating code to define and control a system of connected hardware elements. The method comprises: accepting a system configuration macro with sub-macros for system elements, subsystem elements, and connections there between; accepting a plurality of tables with a plurality of system element behaviors, a plurality of subsystem element behaviors, and a plurality of connection options; defining the system of connected elements in response to selecting sub-macros; defining the physical links between the system elements and the behavior of the system and subsystem elements in response to populating the selected sub-macro parameters; expanding the selected sub-macros; generating executable code; and, accessing the tables in response to parameters in the executable code. Advantageously, the form and function of the system can be defined with programming, or writing application specific code.

25 Claims, 11 Drawing Sheets

U.S. PATENT DOCUMENTS

| | | | |
|---|---|---|---|
| 5,838,922 A | 11/1998 | Galand et al. | |
| 5,838,937 A | 11/1998 | Lee et al. | |
| 5,852,602 A | 12/1998 | Sugawara | |
| 5,872,904 A | 2/1999 | McMillen et al. | |
| 5,883,814 A * | 3/1999 | Luk et al. | 716/2 |
| 5,889,779 A | 3/1999 | Lincoln | |
| 5,991,297 A | 11/1999 | Palnati et al. | |
| 6,044,061 A | 3/2000 | Aybay et al. | |
| 6,055,599 A | 4/2000 | Han et al. | |
| 6,067,286 A | 5/2000 | Jones et al. | |
| 6,072,772 A | 6/2000 | Charny et al. | |
| 6,073,199 A | 6/2000 | Cohen et al. | |
| 6,101,193 A | 8/2000 | Ohba | |
| 6,137,807 A | 10/2000 | Rusu et al. | |
| 6,160,812 A | 12/2000 | Bauman et al. | |
| 6,252,853 B1 | 6/2001 | Ohno | |
| 6,275,491 B1 | 8/2001 | Prasad et al. | |
| 6,285,679 B1 | 9/2001 | Dally et al. | |
| 6,343,081 B1 | 1/2002 | Blanc et al. | |
| 6,345,040 B1 | 2/2002 | Stephens et al. | |
| 6,351,466 B1 | 2/2002 | Prabhakar et al. | |
| 6,411,599 B1 | 6/2002 | Blanc et al. | |
| 6,487,213 B1 | 11/2002 | Chao | |
| 6,490,690 B1 | 12/2002 | Gusler et al. | |
| 6,515,991 B1 | 2/2003 | McKeown | |
| 6,519,540 B1 | 2/2003 | Salandro | |
| 6,549,943 B1 * | 4/2003 | Spring | 709/223 |
| 6,553,026 B1 | 4/2003 | Aihara | |
| 6,563,837 B2 | 5/2003 | Krishna et al. | |
| 6,570,873 B1 | 5/2003 | Isoyama et al. | |
| 6,591,286 B1 | 7/2003 | Lu | |
| 6,594,695 B1 | 7/2003 | Vasamsetti et al. | |
| 6,606,588 B1 * | 8/2003 | Schaumont et al. | 703/15 |
| 6,621,828 B1 | 9/2003 | Field et al. | |
| 6,636,515 B1 | 10/2003 | Roy et al. | |
| 6,636,518 B1 | 10/2003 | Liencres | |
| 6,636,932 B1 | 10/2003 | Regev et al. | |
| 6,643,297 B1 | 11/2003 | Sproat et al. | |
| 6,647,019 B1 | 11/2003 | McKeown et al. | |
| 6,654,374 B1 | 11/2003 | Fawaz et al. | |
| 6,654,381 B2 | 11/2003 | Dally et al. | |
| 6,661,788 B2 | 12/2003 | Angle et al. | |
| 6,667,984 B1 | 12/2003 | Chao et al. | |
| 6,717,956 B1 | 4/2004 | Fan et al. | |
| 6,721,273 B1 | 4/2004 | Lyon | |
| 6,781,992 B1 | 8/2004 | Rana et al. | |
| 6,791,922 B2 | 9/2004 | Suzuki | |
| 6,791,992 B1 | 9/2004 | Yun et al. | |
| 6,804,193 B1 | 10/2004 | Dubreuil | |
| 6,816,500 B1 * | 11/2004 | Mannette et al. | 370/431 |
| 6,850,490 B1 | 2/2005 | Woo et al. | |
| 6,870,831 B2 | 3/2005 | Hughes et al. | |
| 6,871,294 B2 | 3/2005 | Phelps et al. | |
| 6,876,663 B2 | 4/2005 | Johnson et al. | |
| 6,882,649 B1 | 4/2005 | Gura et al. | |
| 6,895,528 B2 | 5/2005 | Cantwell et al. | |
| 6,898,728 B2 | 5/2005 | Drogichen et al. | |
| 6,915,372 B2 | 7/2005 | Magill et al. | |
| 6,934,296 B2 | 8/2005 | Shimojo | |
| 6,940,851 B2 | 9/2005 | Oki et al. | |
| 6,977,935 B2 | 12/2005 | Kamiya et al. | |
| 6,990,063 B1 | 1/2006 | Lenoski et al. | |
| 6,990,072 B2 | 1/2006 | Alasti et al. | |
| 6,999,457 B2 | 2/2006 | Shinohara | |
| 7,009,985 B2 | 3/2006 | Black et al. | |
| 7,016,350 B2 | 3/2006 | Piekarski et al. | |
| 7,020,131 B1 | 3/2006 | Yun et al. | |
| 7,023,840 B2 | 4/2006 | Golla et al. | |
| 7,023,857 B1 | 4/2006 | Chiussi et al. | |
| 7,035,212 B1 | 4/2006 | Mittal et al. | |
| 7,042,842 B2 | 5/2006 | Paul et al. | |
| 7,042,883 B2 | 5/2006 | Fan et al. | |
| 7,050,448 B2 | 5/2006 | Johnson et al. | |
| 7,058,057 B2 | 6/2006 | Dooley et al. | |
| 7,065,046 B2 | 6/2006 | Andrews et al. | |
| 7,072,295 B1 | 7/2006 | Benson et al. | |
| 7,075,990 B2 | 7/2006 | Costa | |
| 7,079,545 B1 | 7/2006 | Yun et al. | |
| 7,085,846 B2 | 8/2006 | Jenne et al. | |
| 7,102,999 B1 | 9/2006 | Sindhu et al. | |
| 7,103,056 B2 | 9/2006 | Chao et al. | |
| 7,110,405 B2 | 9/2006 | Divivier | |
| 7,111,053 B1 * | 9/2006 | Black et al. | 709/220 |
| 7,133,399 B1 | 11/2006 | Brewer et al. | |
| 7,139,995 B1 * | 11/2006 | James-Roxby et al. | 716/16 |
| 7,142,514 B2 | 11/2006 | Wang et al. | |
| 7,151,744 B2 | 12/2006 | Sarkinen et al. | |
| 7,151,925 B2 * | 12/2006 | Ting et al. | 455/418 |
| 7,154,902 B1 | 12/2006 | Sikdar | |
| 7,158,528 B2 * | 1/2007 | Dell et al. | 370/416 |
| 7,158,536 B2 | 1/2007 | Ching et al. | |
| 7,180,867 B2 | 2/2007 | Hoch et al. | |
| 7,203,202 B2 | 4/2007 | Chao et al. | |
| 7,209,453 B1 | 4/2007 | Yun et al. | |
| 7,218,635 B2 | 5/2007 | Haddad | |
| 7,221,652 B1 | 5/2007 | Singh et al. | |
| 7,227,860 B2 | 6/2007 | Isoyama et al. | |
| 7,230,947 B1 | 6/2007 | Huber et al. | |
| 7,236,488 B1 | 6/2007 | Kavipurapu | |
| 7,236,491 B2 | 6/2007 | Tsao et al. | |
| 7,242,686 B1 | 7/2007 | Dougherty et al. | |
| 7,260,066 B2 | 8/2007 | Wang et al. | |
| 7,263,066 B1 | 8/2007 | Yun et al. | |
| 7,283,532 B2 | 10/2007 | Hassan-Ali et al. | |
| 7,293,090 B1 | 11/2007 | Saleh et al. | |
| 7,298,739 B1 | 11/2007 | Miller et al. | |
| 7,298,754 B1 | 11/2007 | Miller et al. | |
| 7,298,756 B1 | 11/2007 | Miller et al. | |
| 7,304,987 B1 | 12/2007 | James et al. | |
| 7,327,725 B2 | 2/2008 | Schriel et al. | |
| 7,342,929 B2 | 3/2008 | Bremler-Barr et al. | |
| 7,349,403 B2 | 3/2008 | Lee et al. | |
| 7,352,694 B1 | 4/2008 | Clovis et al. | |
| 7,406,041 B2 | 7/2008 | Mullendore et al. | |
| 7,412,551 B2 | 8/2008 | Bose et al. | |
| 7,415,594 B2 | 8/2008 | Doerr et al. | |
| 7,424,013 B1 | 9/2008 | Yun et al. | |
| 7,515,537 B2 | 4/2009 | Paul et al. | |
| 7,889,729 B2 | 2/2011 | Yun et al. | |
| 7,965,624 B2 | 6/2011 | Ripa et al. | |
| 2001/0010910 A1 | 8/2001 | Hyldig-Nielsen et al. | |
| 2001/0021191 A1 | 9/2001 | Isoyama et al. | |
| 2001/0028659 A1 | 10/2001 | Johnson et al. | |
| 2001/0050916 A1 | 12/2001 | Krishna et al. | |
| 2002/0012344 A1 | 1/2002 | Johnson et al. | |
| 2002/0039351 A1 | 4/2002 | Wang et al. | |
| 2002/0039364 A1 | 4/2002 | Kamiya et al. | |
| 2002/0058258 A1 | 5/2002 | Wittwer et al. | |
| 2002/0061028 A1 | 5/2002 | Chao et al. | |
| 2002/0105966 A1 | 8/2002 | Patel et al. | |
| 2002/0118692 A1 | 8/2002 | Oberman et al. | |
| 2002/0122428 A1 | 9/2002 | Fan et al. | |
| 2002/0131413 A1 | 9/2002 | Tsao et al. | |
| 2002/0141397 A1 | 10/2002 | Piekarski et al. | |
| 2002/0150056 A1 | 10/2002 | Abadi et al. | |
| 2002/0163922 A1 | 11/2002 | Dooley et al. | |
| 2002/0176431 A1 | 11/2002 | Golla et al. | |
| 2003/0026206 A1 | 2/2003 | Mullendore et al. | |
| 2003/0026267 A1 | 2/2003 | Oberman et al. | |
| 2003/0031193 A1 | 2/2003 | Andrews et al. | |
| 2003/0035427 A1 | 2/2003 | Alasti et al. | |
| 2003/0043847 A1 | 3/2003 | Haddad | |
| 2003/0053470 A1 | 3/2003 | Divivier | |
| 2003/0058880 A1 | 3/2003 | Sarkinen et al. | |
| 2003/0072326 A1 | 4/2003 | Alasti et al. | |
| 2003/0076848 A1 | 4/2003 | Bremler-Barr et al. | |
| 2003/0112757 A1 | 6/2003 | Thibodeau et al. | |
| 2003/0152084 A1 | 8/2003 | Lee et al. | |
| 2003/0165151 A1 | 9/2003 | Chao et al. | |
| 2003/0174701 A1 | 9/2003 | Angle et al. | |
| 2004/0030766 A1 * | 2/2004 | Witkowski | 709/223 |
| 2004/0030859 A1 | 2/2004 | Doerr et al. | |
| 2004/0047408 A1 | 3/2004 | Koenenkamp et al. | |
| 2004/0081167 A1 | 4/2004 | Hassan-Ali et al. | |
| 2004/0085894 A1 | 5/2004 | Wang et al. | |
| 2004/0093601 A1 | 5/2004 | Master et al. | |
| 2004/0100946 A1 | 5/2004 | Schriel et al. | |

| | | | | | |
|---|---|---|---|---|---|
| 2004/0153566 A1 | 8/2004 | Lalsangi et al. | 2006/0127942 A1 | 6/2006 | Straume et al. |
| 2004/0160970 A1 | 8/2004 | Dally et al. | 2006/0182440 A1 | 8/2006 | Stefanov et al. |
| 2004/0161767 A1 | 8/2004 | Baldwin et al. | 2006/0274656 A1 | 12/2006 | Paul et al. |
| 2005/0214825 A1 | 9/2005 | Stuelpnagel | 2008/0256455 A1 | 10/2008 | Della Ripa et al. |
| 2005/0239192 A1 | 10/2005 | Nasarabadi et al. | | | |
| 2005/0244836 A1 | 11/2005 | Tsang et al. | | | |
| 2006/0013207 A1 | 1/2006 | McMillen et al. | | | |

* cited by examiner

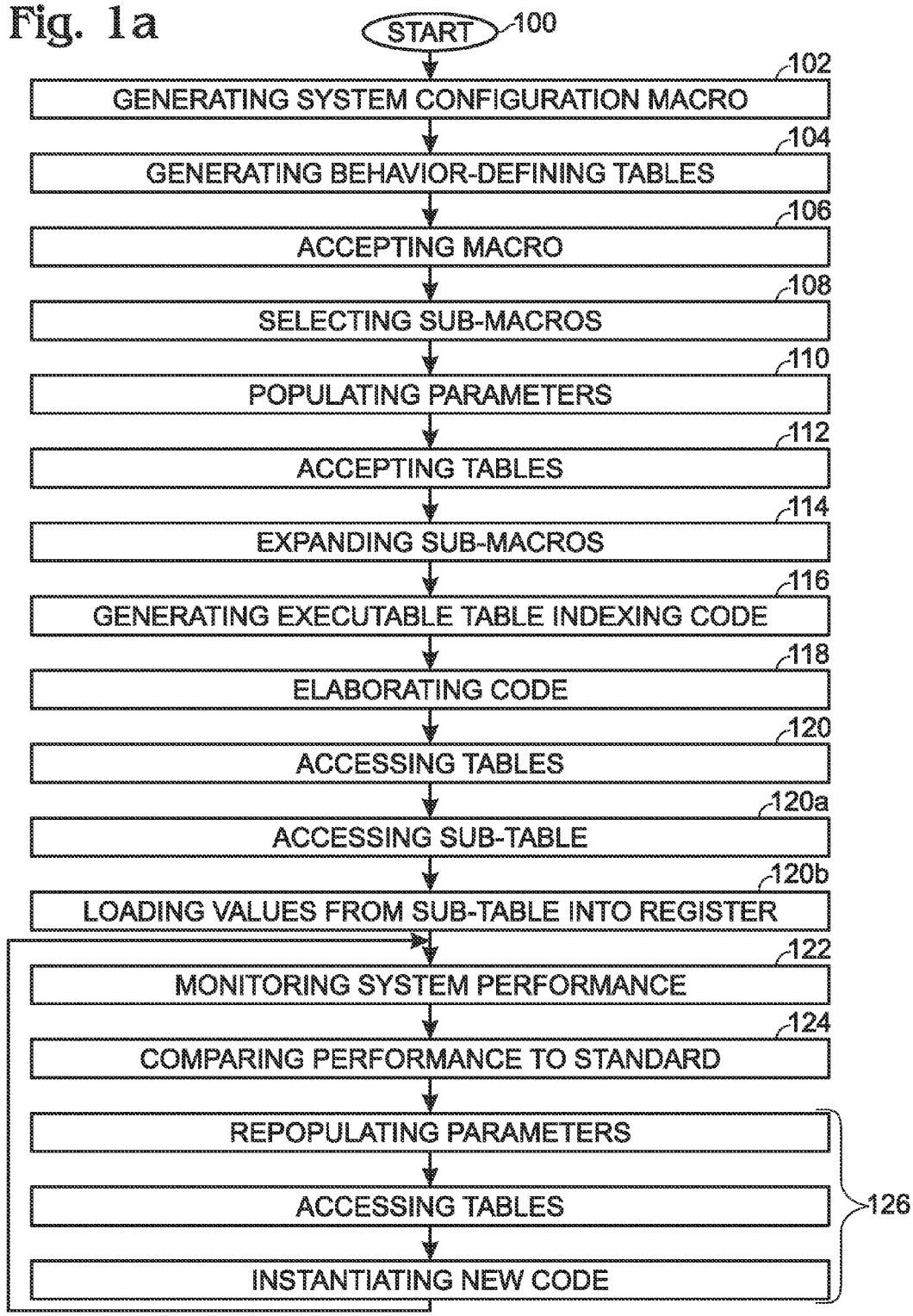

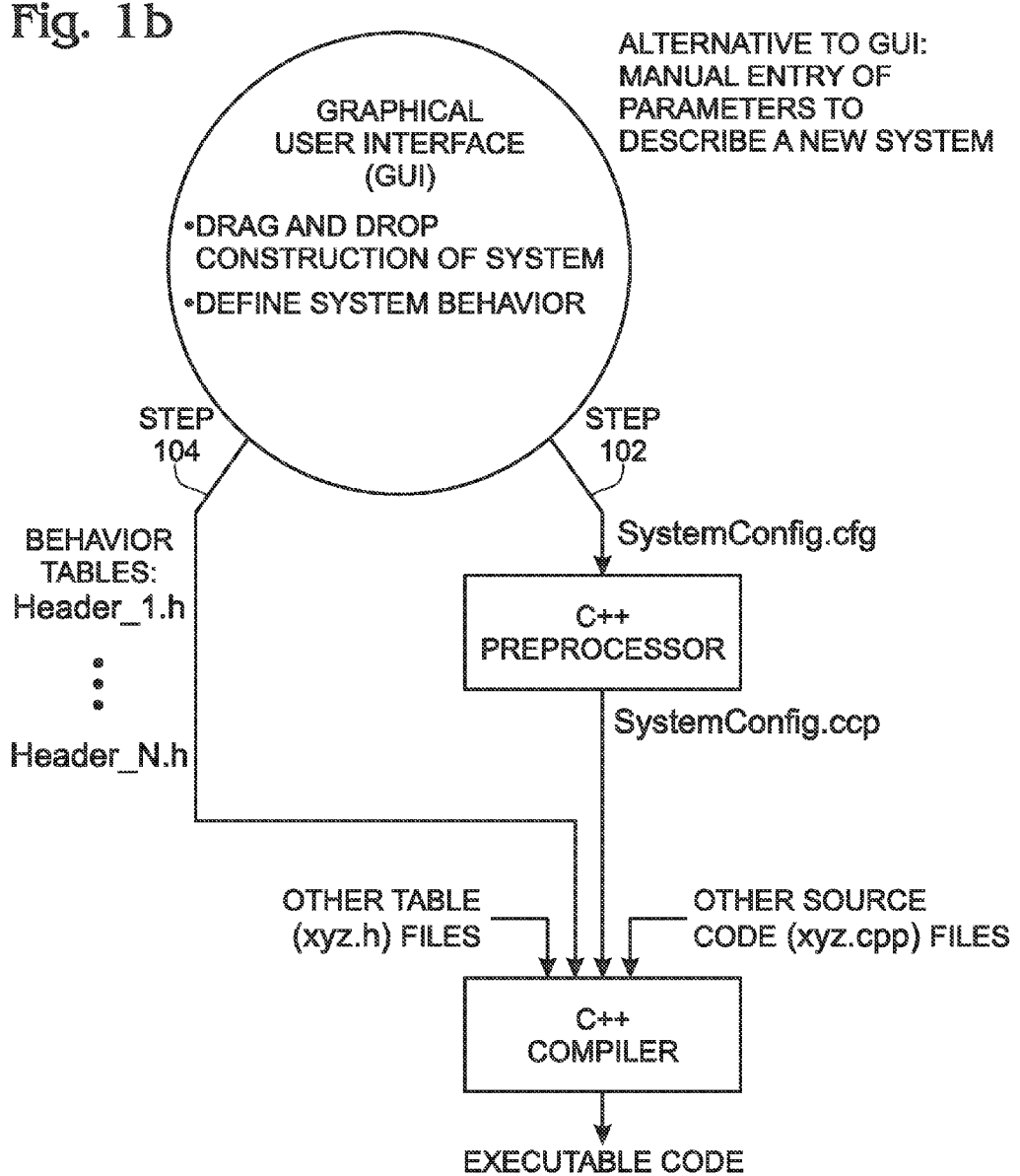

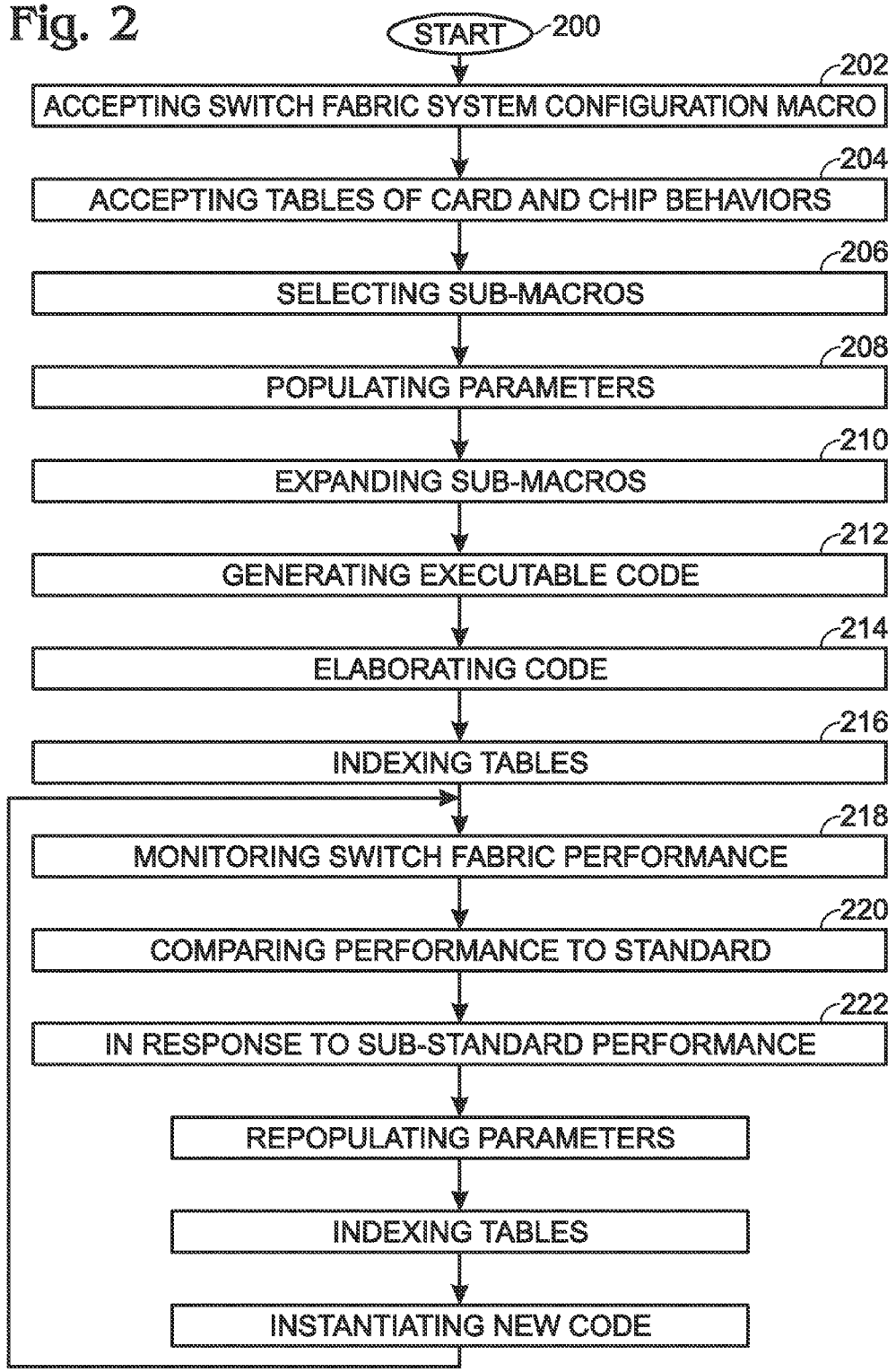

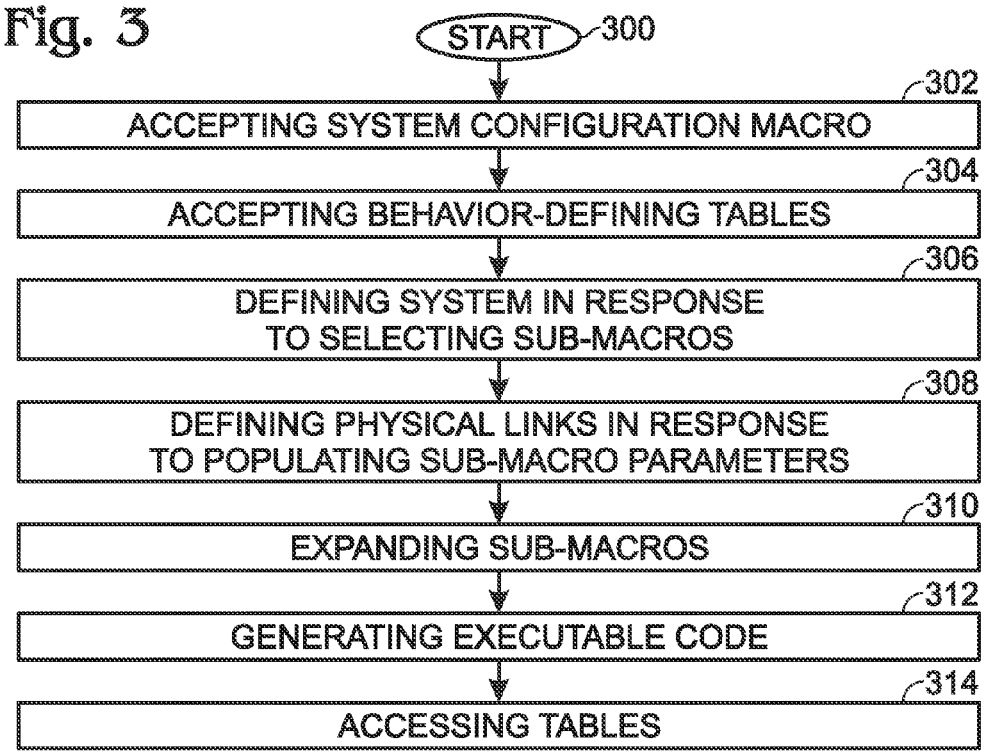
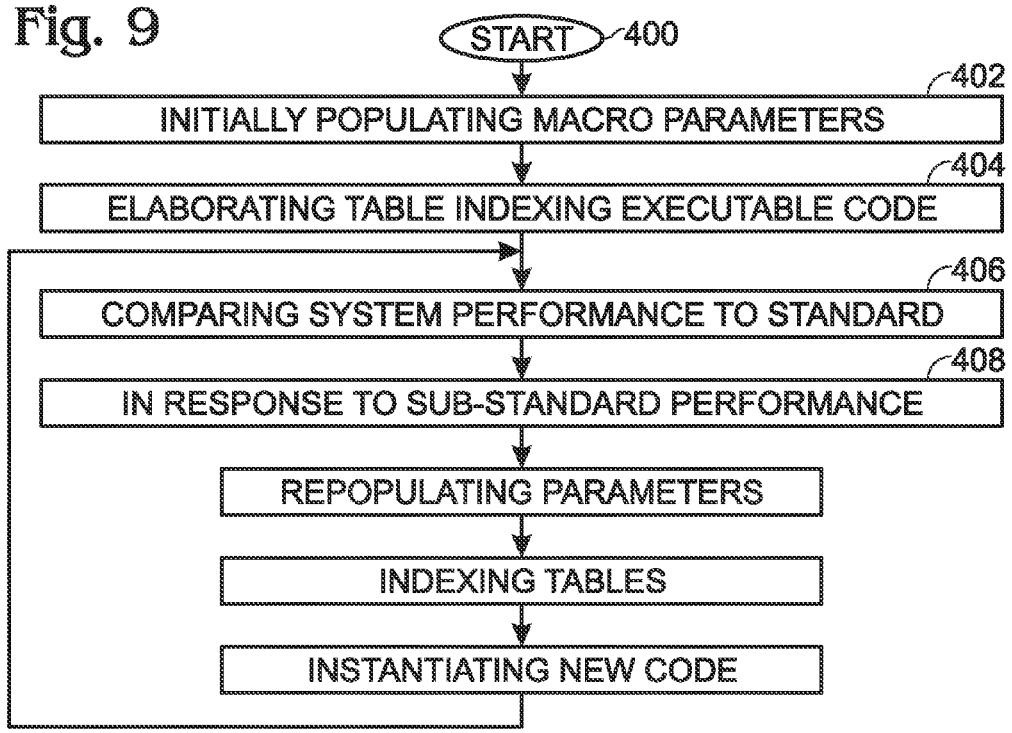

Fig. 5 EXAMPLE OF MACRO EXPANSION

Fig. 7

```
Static CHIP_REG_DEFINITION g_PQ_I_ChipRegisters[ ] = {
//===========================================================
//   Chip Mode Format:
//
//   [ 7: 0]  PQ Mode #
//   ---
//   [10: 8]  Reserved (Submode #: based on extended variation of PQ or
//                     other chips configuration)
//   [11]     PQ # (Single PQ = 0, Dual PQ = 0 or 1)
//   [13:12]  Port Group (0:Ports 0-7;1:Ports 8-15;2:Ports 16-23;3:Ports 24-31)
//   [14]     Aggregation (Non-aggregated = 0, Aggregated = 1)
//   [15]     Credit Mode (Single Credit Mode = 0, Dual Credit Mode = 1)
//   ---
//   [23:16]  Credit Mask Controller Link [7:0] (Enable = 1, Disable = 0)
//   ---
//   [25:24]  Channel 0 format
//   [27:26]  Channel 1 format
//   [29:28]  Channel 2 format
//   [31:30]  Channel 3 format
//            0: Yuni 64 byte cell
//            1: Yuni 80 byte cell
//            2: Vix OC-48
//            3: Vix OC-192
//
//   Table Format:
//
//   chip              reg    address  address  data   function
//   mode              page   hex      decimal         (ABS, XOR, OR, AND)
//   =========         ====   =======  =======  ====   ==================
//   {0x00000000,      0x00,  0x00,    /* 0 */  0x00   ABS}, // example entry
...
//   Family Mask: 0xFF0037FF
//   BEGIN Sys_config=3, PQ_mode=8 Family
//   BEGIN Sys_config=3, PQ_mode=8, credit mask=0xAA
//===========================================================
//   Chip Configuration Mode: 0x55AA0003
//   [Channel Format |Credit Mask Link | CM A PGr P#Reserv| Sys_Congif Num ]
//   [    31:24      |     23:16       |      15:8        |      7:0       ]
//   [  0 1 0 1 0 1 0 1 | 1 0 1 0 1 0 1 0 | 0 0 0 0 0 0 0 0 | 0 0 0 0 0 0 1 1 ]
//===========================================================
//   Credit Mask
     {0x55AA0003, 0x00, 0x9F,  /* 159 */  0xAA,  ABS},
//   Credit Config
     {0x55AA0003, 0x00, 0x1F,  /* 31  */  0x00,  ABS},
//   Credit Based Flow Control Encoder Configuration
     {0x55AA0003, 0x00, 0xAB,  /* 171 */  0x40,  ABS}, // Y=1, X=0
//   END Sys_config=3, PQ_mode=8,credit mask=0xAA
```

```
// Decoder Table ID: 0x0003
{
    0x00, 0x04, 0x08, 0x0C, 0x00, 0x04, 0x08, 0x0C,
    0x00, 0x04, 0x08, 0x0C, 0x00, 0x04, 0x08, 0x0C,
    0x01, 0x05, 0x09, 0x0D, 0x01, 0x05, 0x09, 0x0D,
    0x01, 0x05, 0x09, 0x0D, 0x01, 0x05, 0x09, 0x0D,
    0x02, 0x06, 0x0A, 0x0E, 0x02, 0x06, 0x0A, 0x0E,
    0x02, 0x06, 0x0A, 0x0E, 0x02, 0x06, 0x0A, 0x0E,
    0x03, 0x07, 0x0B, 0x0F, 0x03, 0x07, 0x0B, 0x0F,
    0x03, 0x07, 0x0B, 0x0F, 0x03, 0x07, 0x0B, 0x0F,
}
```

```
// BEGIN Program MA for PQ mode 0x55AA0003
// mode            page    reg             value  flag
   {0x55AA0003,    0x09,   0x46,  /* 70 */ 0xCB,  ABS},
   {0x55AA0003,    0x09,   0x47,  /* 71 */ 0xFF,  ABS},
   {0x55AA0003,    0x09,   0x48,  /* 72 */ 0x10,  ABS},
// END
```

```
// BEGIN Program Arbiter for PQ chip modes:
// 0x55AA0003, 0x55AA0004
   {0x55AA0003,    0x00,   0x12,  /* 18 */ 0x08,  ABS},
   {0x55AA0003,    0x01,   0x12,  /* 18 */ 0x09,  ABS},
   {0x55AA0003,    0x02,   0x12,  /* 18 */ 0x08,  ABS},
   {0x55AA0003,    0x03,   0x12,  /* 18 */ 0x09,  ABS},
// END
```

Fig. 10 *(PRIOR ART)*
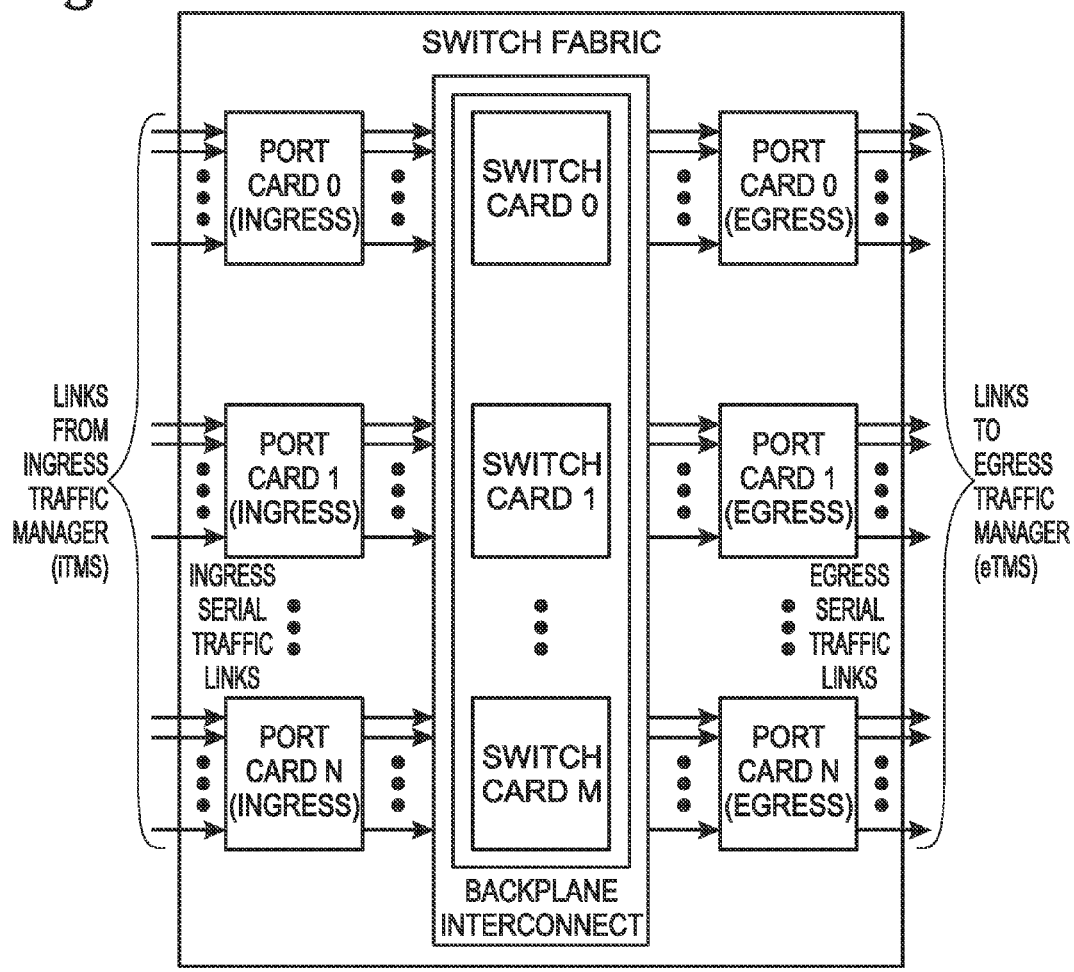

METHOD FOR AUTOMATICALLY GENERATING CODE TO DEFINE A SYSTEM OF HARDWARE ELEMENTS

RELATED APPLICATIONS

This application is a continuation-in-part of application entitled, SYSTEM AND METHOD FOR SWITCHING VARIABLY SIZED INFORMATION GROUPS, invented by Yun et al., Ser. No. 10/023,266, filed Dec. 14, 2001 now abandoned.

This application is a continuation-in-part of application entitled, SYSTEM AND METHOD FOR SIMULTANEOUS DEFICIT ROUND ROBIN PRIORITIZATION, invented by Yun et al., Ser. No. 10/022,673, filed Dec. 17, 2001 now U.S. Pat. No. 7,079,545.

This application is a continuation-in-part of application entitled, SYSTEM AND METHOD FOR GRANTING ARBITRATED BIDS IN THE SWITCHING OF INFORMATION, invented by Yun et al., Ser. No. 10/029,581, filed Dec. 20, 2001 now U.S. Pat. No. 7,424,013.

This application is a continuation-in-part of application entitled, SYSTEM AND METHOD FOR HIERARCHIAL SWITCHING, invented by Yun et al., Ser. No. 10/035,835, filed Dec. 24, 2001 now U.S. Pat. No. 7,020,131.

This application is a continuation-in-part of a pending application entitled, SYSTEM AND METHOD FOR TOLERATING DATA LINK FAULTS IN A PACKET COMMUNICATIONS SWITCH FABRIC, invented by Clovis et al., Ser. No. 10/373,139, filed Feb. 24, 2003, which is incorporated herein by reference.

BACKGROUND OF THE INVENTION

1. Field of the Invention

This invention generally relates to software programming and, more particularly, to a method for automating generating code that defines and controls a system of network-connected hardware elements.

2. Description of the Related Art

Conventionally, software can be generating by using macros to construct calls to a particular interface in the effort of promoting hardware independent software. However, the interfaces so constructed are not configuration independent. If the system hardware connections are modified, the macros must also be modified. This can be very difficult to for a chip vendor to manage as new customers decide to use a chipset of complex programmable devices, especially if the original design team has been redirected to other projects.

There is industry demand for integrated circuits (ICs) switching systems that can be easily scaled for Network Access, the Network Edge, or a Core Switch Router, at the high end. SCSA (Signal Computing System Architecture) defines a switch fabric to be the facility for connecting any two (or more) transmitting or receiving Service Providers.

FIG. 10 is a schematic block diagram of a general switch fabric system (prior art). Traffic enters the system on the ingress side (the left side of the figure). Traffic exits the system on the egress side (the right side of the figure). The port card ingress and egress structures are sometimes subdivided into channels and subchannels. The packet headers specify a required destination port card, channel, and subchannel. The system must synchronously route each ingress packet to the correct egress destination.

Packets are converted into frames by ingress traffic managers (iTMs). A frame is a logical unit of data, which is often a small piece of a much larger data set such as a file or image. The iTMs feed the ingress side of the fabric. The switch fabric might convert the frame format to a "native" format, and then on egress, convert the data back into the TM frame format before sending the data to the egress traffic managers (eTMs). If the frames are fixed size (for example: 53 bytes, 64 bytes, or 80 bytes), the frames are often called cells.

Protocol Specific vs. Protocol Agnostic

A switch fabric can be protocol specific or protocol agnostic. An example of a protocol specific switch fabric would be a system designed and optimized specifically for asynchronous transfer mode (ATM) traffic. Another example would be a switch that handles only TCP/IP traffic. The obvious disadvantage of a switch fabric hardwired to handle a specific protocol is lack of flexibility. Service providers want to sell services to a variety of customers in various industries. Protocols vary from industry to industry.

Even within one protocol type, there can be protocol upgrades. For example, TCP/IP, the machine language of Internet routers, now runs primarily "IPv4." This protocol, successful as it has been, has a lack of available addresses, poor security features, and no "quality of service" (QoS) provisions. The next generation Internet protocol is "IPv6." It provides solutions to these limitations.

A protocol agnostic switch fabric works equally well with all protocol types, however, the traffic manager must be responsible for recognizing specific protocol types. The disadvantage of a protocol agnostic switch fabric is that it may be more complicated, and perhaps slower than a switch fabric dedicated to a particular protocol.

Packet Striping vs. Single Link per Packet

The simplest way for a traffic manager to transmit a packet into a switch fabric is to transmit the packet serially along one line. Striping is a way of achieving higher bandwidth by transmitting a single packet across multiple ingress/egress lines. For example, a TM can transmit a packet into a switch fabric eight times as fast if the packet is sliced into eight pieces (stripes) by the TM, and conveyed into the fabric along 8 parallel lines simultaneously. The fabric captures the packet in memory, routes it to the required egress destination, and slices the packet into 8 parallel lines before transmitting the packet to the egress TM.

The upside to packet striping is the potential for lower latency. There are several negative aspects of packet striping:

if one of the links is damaged (1 of 8 in the example above), the entire channel is out of service, degrading fault tolerance; and, the interface between the TM and switch fabric is more complicated. Circuitry must be used to slice the packet into stripes and reassemble it into packets.

Single-Cell Packet vs. Multi-Cell Packets

Many switch fabrics now deployed and passing revenue traffic, especially in wide area networks (WANs), use asynchronous transfer mode (ATM) packets. ATM packets are single-cell packets, with a fixed cell size of 53 bytes, 48 bytes of which is the information payload. The ATM specification evolved in the 1980s and early 1990s. It was then believed that variable length (multi-cell) packets would be too difficult to implement at rates needed for wire-speed traffic. The single-cell solution was a compromise that would work for voice data, video data, multimedia data, email data, file data, etc. With a fixed frame size, switch designs are simplified and ultimately faster.

However, files are better sent in large frames. Voice switching performs better with small bursts of data, corresponding to analog-to-digital converter time slots. Large frames and concomitant switching latencies can render a switch useless for most 2-way voice applications. Voice communications require low latency (time delay). Since ATM had to work for all network data, the small payload (voice) requirements prevailed at the expense of the large frame applications.

For large frames or packets it is much more efficient to establish a path from an ingress port card to the required egress destination, and then leave this path undisturbed until the packet is completed. With single cell packets, the ingress port card must bid for, accept grants, and then schedule each cell of a multi-cell packet.

There are also Frame Relay switch fabrics. Frame Relay is a single-cell protocol, albeit with frame size ranging from 6 to 4096 bytes. Such switch fabrics have been deployed and passing revenue traffic since the early 1990s. These switch fabrics have generally not been used for voice data because of the large latency. Only highly compressed voice traffic works well over frame relay. Voice-over-frame relay was added as an afterthought by network engineers. Frame relay excels at data communications such as local area network internetworking (LAN-to-LAN). Such communications are very high speed and bursty, with non-critical latency constraints.

Cut-Through vs. Store-and-Forward

The conventional method of switch fabric packet routing is called Store-and-Forward. In this method, the switch fabric accepts an input packet and buffers the packet on the ingress side of the fabric, making sure the packet was received intact, knowing the exact number of cells in the packet. The problem with the store-and-forward method is the added latency of buffering the packet. In Cut-through Packet Routing (CPR), a switch fabric is able to send the incoming packet cells to the correct egress port as soon as the destination address is known.

Memory-Based vs. Arbitrated Crossbar

A switch fabric can use memory-based crossbars or arbitrated crossbars. A memory-based crossbar is sometimes called a "shared memory switch." Ingress packets flow from the port cards into a huge memory bank, which serve as the switch. From the memory bank, the destination address is determined from egress port destination information in the cell headers. The problem with these switch fabrics is that they become prohibitively expensive and large from all the required high-speed memory. Such fabrics cannot be used to reach terabit total switching speeds with technology available today.

It would be advantageous if new firmware executable code could be easily created for new customers by field application engineers (FAEs). Preferably, such code genertion could occur without the need for delving into the finer details of the firmware, knowing the chipset register definitions, or modifying the source code. If the firmware generation process could be highly automated, customers could even learn how to deploy a wide variety of system configurations themselves, with little FAE support, after receiving training for the chipset and its firmware environment.

It would be advantageous to deploy a new system by running a graphical user interface (GUI) on a workstation, with the GUI prompting the user(s) through a process that automatically defines the form and function of the system, without the usual arduous (and expensive) programming. Using "drag and drop" mouse commands, pull down menus, and icons, the customer or FAE could create a completely new firmware build customized for a completely new hardware configuration.

It would be advantageous if the maintenance of the system firmware could be focused on the code generation system as well as the algorithmic code, without the drudgery of "starting from scratch" for each new system or customer.

A good example of a candidate chipset for employing the method described above is the Cyclone Switch Fabric. This set of four chips has thousands of registers and 100's of millions of logic gates. A huge and steep learning curve must be overcome for even the most seasoned firmware engineer to master the multiplicity of register settings, system configuration options, and complex algorithms used in the firmware. It would be advantageous of the Cyclone chipset firmware can developed for new systems with the help of automated tools.

It would be advantageous if the automatic system definition process could also be applied to a broader range communications chipsets. Other examples chipsets might include framers, media access controllers (MACs), PHY devices (used in the OSI Physical layer), Physical Medium Dependent (PMD) devices, framers, network processors, and traffic managers. All such devices have registers, which must be loaded to configure the devices and registers, which must be read to monitor the health and status of the devices. All such devices also must be connected together in a specific manner in a newly proposed system (the form of the system). And all such devices have a multiplicity of parameter selections (the function of the system). The system engineer, solutions architect, or FAE could use the automated firmware tools on customer visits to propose new solutions to customer needs.

SUMMARY OF THE INVENTION

A method is provided for automatically generating code to define and control a system of connected hardware elements. The method comprises: accepting a system configuration macro with sub-macros for system elements, subsystem elements, and connections there between; accepting a plurality of tables with a plurality of system element behaviors, a plurality of subsystem element behaviors, and a plurality of connection options; defining the system of connected elements in response to selecting sub-macros; defining the physical links between the system elements and the behavior of the system and subsystem elements in response to populating the selected sub-macro parameters; expanding the selected sub-macros; generating executable code; and, accessing the tables in response to parameters in the executable code. Alternately stated, the expansion of the sub-macros defines the form and the function of the network hardware, with programming.

Additional details of the present inventions methods are provided below.

BRIEF DESCRIPTION OF THE DRAWINGS

FIG. 1a is a flowchart illustrating the present invention method for automatically generating code to define and control a system of connected hardware elements.

FIG. 1b illustrates specifics relating to Steps 102 and 104 of FIG. 1a.

FIG. 2 is a flowchart illustrating the present invention method for automatically generating code to define and control a switch fabric of connected cards.

FIG. 3 is a flowchart illustrating another aspect of the present invention method for automatically generating code to define and control a system of connected hardware elements.

FIG. 7 depicts an excerpt of a PQ chip configuration file.

FIG. 9 is a flowchart illustrating the present invention method for autonomously discovering the configuration of system-connected elements.

FIG. 10 is a schematic block diagram of a general switch fabric system (prior art).

DETAILED DESCRIPTION OF THE PREFERRED EMBODIMENTS

Figure 4:
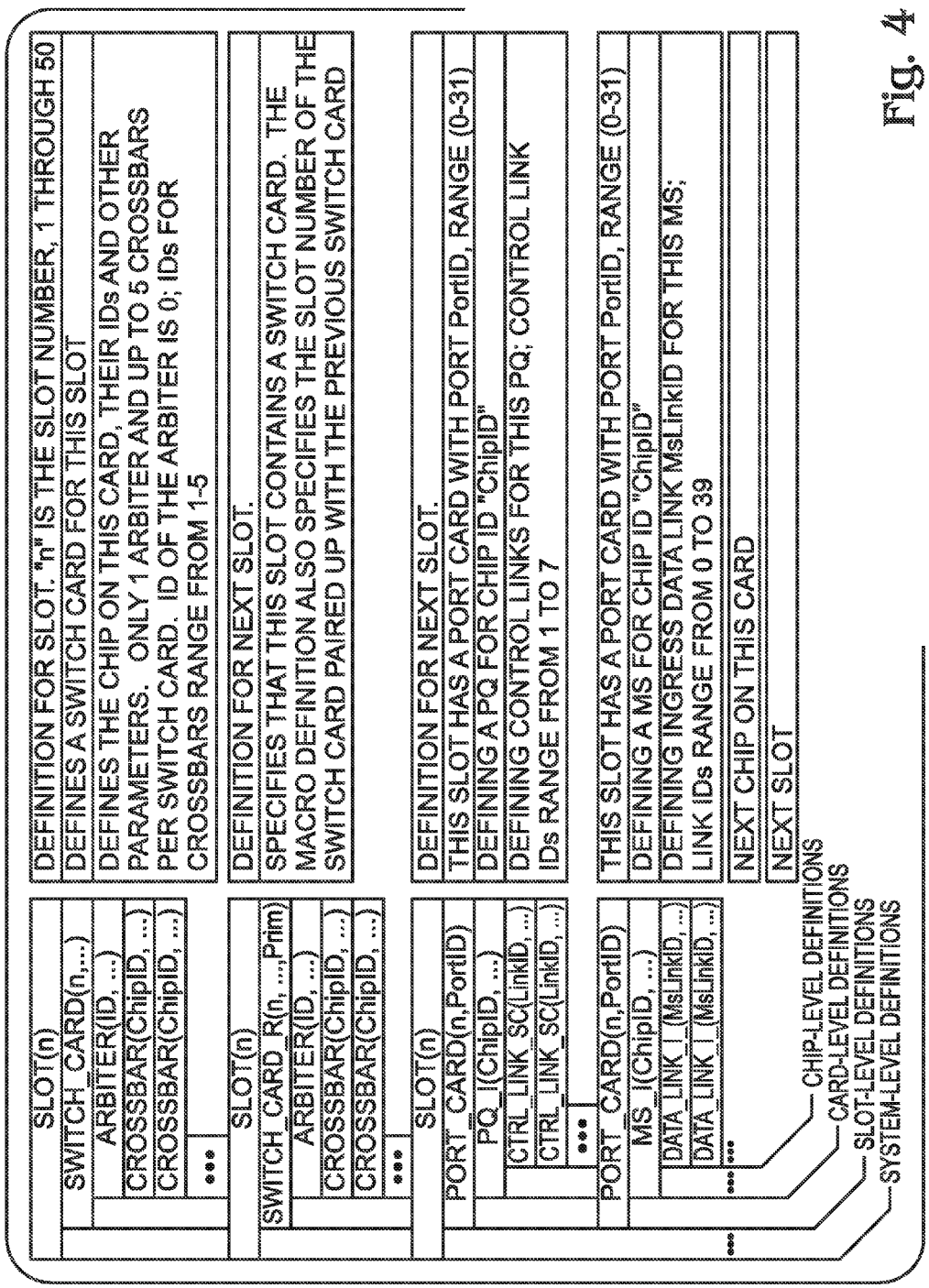
FIG. 4 is a diagram illustrating the hierarchy of the system configuration file.

FIG. 1a is a flowchart illustrating the present invention method for automatically generating code to define and control a system of connected hardware elements. Although the method (and methods associated with FIGS. 2 and 3 below) is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 100.

Step 102 generates a system configuration macro. Step 104 generates tables defining a plurality of system element behaviors, a plurality of subsystem element behaviors, and a plurality of connection options.

FIG. 1b illustrates specifics relating to Steps 102 and 104 of FIG. 1a. In some aspects, Steps 102 and 104 are accomplished using a graphical user interface (GUI). Alternately, the steps are enabled by the manual entry of parameters.

Step 106 accepts the system configuration macro with sub-macros for defining system elements, subsystem elements, and connections there between. Step 108 selects sub-macros. Step 110 populates parameters in the selected sub-macros. Step 112 accepts the plurality of tables defining a plurality of system element behaviors, a plurality of subsystem element behaviors, and a plurality of connection options. Step 114 expands a plurality of sub-macros with populated parameters. In some aspects, Step 114 expands the parameters of the selected sub-macros. Step 116 generates executable table indexing code. For example, the code can be generated by means of a complier specific to the target processor. Step 118 elaborates the executable code. Step 120 accesses the tables in response to parameters in the executable code. The above-mentioned steps describe the steps that a user would perform to define, compile, and run the code.

In some aspects of the method, elaborating the executable code in Step 118 includes differentiating the executable code into code sections corresponding to system and subsystem elements. Then, accessing the tables in response to the parameters in the executable code in Step 120 includes loading accessed tables into corresponding subsystem element memories.

In other aspects, accepting the system configuration macro with sub-macros for defining system elements, subsystem elements, and the connections there between, in Step 106, includes accepting a hierarchical set of fields, with subsystem elements being indentured to system elements. Then, accessing the tables in response to the parameters in the executable code in Step 120 includes substeps. Step 120a accesses a sub-table in response to indexing a table. Step 120b loads values from the sub-table in chip registers.

In some aspects, expanding the plurality of sub-macros with populated parameters in Step 114 includes generating C++ language code. Then, generating executable code in Step 116 includes generating machine code.

To better illustrate the invention, the above-mentioned steps can be understood as a process of configuring a switch fabric of cards including firmware-enabled chips. Then, accepting the system configuration macro with sub-macros for defining system elements, subsystem elements, and the connections there between, in Step 106 includes accepting a switch fabric configuration macro for defining switch fabric cards, firmware processing integrated circuits (chips) on the cards, and the connections between the cards. Further, Step 106 may include accepting sub-macros to hierarchically define the system level (slot number), the slot level (card type), card level (chip type), and chip level (link types and endpoint).

In some aspects, accepting sub-macros to hierarchically define the system level, the slot level, card level, and chip level, (Step 106) includes differentiating at the slot level between port cards to manage traffic flow in and out of the switch fabric, and switch cards to manage backplane traffic flow between the port cards. In other aspects, Step 106 includes differentiating at the port card level between memory subsystems (MSs) and queuing/scheduling (QS) devices. In yet other aspects, Step 106 includes differentiating at the switch card level between arbiter and crossbars. Further, Step 106 may include defining MS chip level data link connections.

Defining MS chip level data link connections may further include defining input port card ingress data links, backplane data links, and output port card egress data links. In other aspects, accepting sub-macros to hierarchically define the system level, the slot level, card level, and chip level, in Step 106 includes defining PQ chip level control link connections. That is, defining grant/bid control links between input port card ingress QS devices and switch card arbiters and defining grant/bid control links between output port card ingress QS devices and switch card arbiters.

In other aspects, accepting sub-macros in Step 106 includes defining the chip level. Then, accessing the tables in response to parameters in the executable code in Step 120 includes accessing tables to define chip default register settings and chip modes.

Some aspects of the method include further steps. Step 122, following the elaboration of the executable code, monitors system performance. Step 124 compares the system performance to a standard. The standard may be that the data and/or control links merely interface. Alternately, the standard may be a bit error rate, for example, or an information bandwidth. Step 126, in response to sub-standard system performance: automatically repopulates selected parameters in the selected sub-macros; accesses tables in response to the repopulated parameters; and, instantiates new executable code. Note, Step 122 through 126 may be preformed iteratively until a minimum level (the standard) of system performance is obtained. In other aspects, the method may shut to system down if a minimum level of performance is not (eventually) achieved.

FIG. 2 is a flowchart illustrating the present invention method for automatically generating code to define and control a switch fabric of connected cards. The method starts at Step 200. Step 202 accepts a system configuration macro with sub-macros for defining switch cards, port cards, integrated circuits (chips) on the cards, and the connections there between. Step 204 accepts a plurality of tables defining a plurality of card behaviors, a plurality of chip behaviors, and a plurality of connection options. Step 206 selects sub-macros. Step 208 populates parameters in the selected sub-macros. Step 210 expands the selected sub-macros. Step 212 generates executable code. Step 214 elaborates the executable code. Step 216, following Step 214, indexes the tables in response to the populated parameters.

In some aspects, elaborating the executable code in Step 214 includes differentiating the executable code into code sections corresponding to cards and chips. Then, indexing the tables in response to calling the parameters (Step 216) includes loading accessed tables into corresponding card chip memories.

In other aspects, Step 218, following the elaboration of the switch fabric with the executable code, monitors switch fabric performance. Step 220 compares the switch fabric performance to a standard. Step 222, in response to sub-standard switch fabric performance: automatically repopulates selected parameters in the selected sub-macros; indexes tables in response to the repopulated parameters; and, instantiates new executable code.

FIG. 3 is a flowchart illustrating another aspect of the present invention method for automatically generating code to define and control a system of connected hardware elements. The method starts at Step 300. Step 302 accepts a system configuration macro with sub-macros for system elements, subsystem elements, and connections there between. Step 304 accepts a plurality of tables with a plurality of system element behaviors, a plurality of subsystem element behaviors, and a plurality of connection options. Step 306 defines the system of connected elements in response to selecting sub-macros. Step 308 defines the physical links between the system elements and the behavior of the system and subsystem elements in response to populating the selected sub-macro parameters. Step 310 expands the selected sub-macros. Step 312 generates executable code. Step 314 accesses the tables in response to parameters in the executable code.

FIG. 9 is a flowchart illustrating the present invention method for autonomously discovering the configuration of system-connected elements. The method starts at Step 400. Step 402 initially populates parameters in a macro. In some aspects, the macro is populated with default parameters. Step 404 elaborates table indexing executable code. Step 406 compares the system performance to a standard. Step 408, in response to sub-standard system performance: automatically repopulates parameters in the macro; indexes tables in response to the repopulated parameters; and, instantiates new table indexing executable code.

Functional Description

The present invention methods use C++ macros to define the physical configuration of a multi processing packet switch fabric system in a hierarchical manner that includes automatic code generation and chip register programming.

The System Configuration File is a human-readable configuration file and a C++ source file containing C++ macros combine to expand into executable code that forms the run-time implementation of the a packet switch fabric system, for example. The system configuration file is a human-readable text file that defines the hardware layout in its entirety, and performs initial programming of the chips for a discovered hardware configuration.

FIG. 4 is a diagram illustrating the hierarchy of the system configuration file. The format of the configuration file is itself hierarchical, indentured to reflect higher and higher specificity of the system. The firmware actively monitors the health of control and data links between switch chips and adjusts data and control paths dynamically to maintain optimum performance levels. This includes automatic re-assignment of control links and addition or removal of data links. Multiple levels of control performance is supported if the number of control links limits credit bandwidth, automatically switching to dual-credit mode to preserve credit bandwidth.

The present invention method is different from conventional system configuration macros in that the form and function of an entire physical subsystem is described and defined in a text file consisting of C++ language macros and hierarchical data tables. Typically, a conventional Element Management System (EMS) maintains a provisioning database that describes cross-connect configurations, equipment and facility states. Various layers of system code use this database to program the hardware. The physical configuration of the system is opaque to this software. The physical layout, connectivity is manifest only when viewed by an operator through the use of a graphical user interface (GUI) that creates a diagram, or as a result of a report output.

The present invention system configuration file and tables makes the firmware agnostic of the complete subsystem, enabling it to autonomously reconfigure itself based on its own discovery. A complex system is modeled as a hierarchy of autonomous subsystems managed by a high-level communication protocol. The approach is also flexible; practically every physical parameter of the system is captured in the configuration tables. For ease of use, human-readable macro text is pre-processed, not interpreted. Therefore, any ANSII C++ preprocessor can process it. A special program is not required for interpretation, as an interpreter need not be created to process the file. The invention is useful in that the tables that drive the configuration file can be used as input to a GUI that can graphically diagram how the system is configured both physically and functionally. That is, the combination of system configuration file and the tables completely describe both the physical and functional aspects of the switch subsystem.

The AMCC Cyclone Firmware System Configuration Mechanism

The present invention method is enabled, in one specific embodiment, as the Cyclone Firmware Subsystem (CFS) System Configuration mechanism, that encapsulates the form and function of an entire physical Cyclone Switch Suosystem (CSS) in a text file consisting of C++ language macros and hierarchical data tables.

The configuration system is key to ease of use and flexibility, capturing every physical parameter of the CSS in human-readable tables and macros that can be processed by any ANSII C++ preprocessor to generate the code required to run on any variant of a Cyclone switch system. No special interpreters or proprietary pre-processors are required. The CFS configuration mechanism is not hardware independent, but configuration independent, meaning the CFS can re-program the Cyclone chips to accommodate all possible system configurations.

The configuration table approach to system programming is more useful than modifying source code because the tables can alternatively serve as input to a Graphical User Interface (GUI) tool that generate a picture of the system, graphically diagramming how the system is configured, both physically and functionally.

GLOSSARY

API Cyclone Firmware Subsystem Application Programming Interface—The API is provided as a means for software on the system controller, or "Host", to communicate with the Cyclone Firmware Subsystem.

CFS Cyclone Firmware Subsystem—CFS refers to the entire collection of firmware that represents the a standalone subsystem that controls the operation of the Cyclone switch hardware. A major sub-component of the CRF is the Token Bus Driver, which is a layer of software that handles the low-level, OS and hardware-dependent read and write operations on the token bus.

CSS Cyclone Switch Subsystem—CSS refers to all of the hardware and firmware that makes up a complete Cyclone packet switch fabric. The CSS consists of the Cyclone chips on various port cards and switch cards that comprise the hardware and the firmware that operates on those chips. The CSS is the only context that includes the concept of hardware, all other terms that remain refer to firmware entities.

Configuration table module: a programming abstraction of the compile-time configuration class and run-time configuration table object that is encapsulated as a manageable entity, dependent only upon its interface and not implementation. The configuration table module is addressed through the configuration table module API.

Configuration table class: compile-time definition of the structure, form, properties and methods (functions) of a configuration table object.

Configuration table object: run-time instantiation of a configuration table class, or variable of type "ConfigTable". The configuration table object includes the configuration table and the methods that operate upon the table.

Configuration file: a build-time entity, the configuration file contains the macro definitions that, when elaborated (run, or executed) create the methods that execute upon the data in the configuration table. In Release 1.0 of the firmware, the configuration file name is "SystemConfiguration.cfg".

Configuration table: a run-time entity, the configuration table is the RAM-resident aggregation of data tables that define the Cyclone fabric subsystem configuration, and the values contained in every chip register contained in the system.

Configuration Table Module

This section describes the purpose, structure and function of the configuration table module. The Configuration Table Module consists of the system configuration files and associated methods. This architectural feature of the CFS abstracts the entire Cyclone switch fabric into one central configuration file. The configuration table allows a complete Cyclone fabric subsystem to be defined and modified without the need to re-program, greatly simplifying the system management overhead required to provision, monitor and upgrade the packet fabric subsystem.

The System Configuration.cfg file contains macros that describe the hardware configuration to the Cyclone firmware. The macros expand into object code that executes on the switch card CPU. For example the SWITCH_CARD macro will be replaced by code that, upon execution (elaboration), will instantiate a switch_card object. The System Configuration File is a human-readable configuration file and a C++ source file containing C++ macros combine to expand into executable code that forms the run-time implementation of the Cyclone packet switch fabric system. It defines the hardware layout in its entirety, and performs initial programming of the cyclone chips for a discovered hardware configuration. The format of the configuration file is itself hierarchical, indentured to reflect higher and higher specificity of the system.

Figure 5:
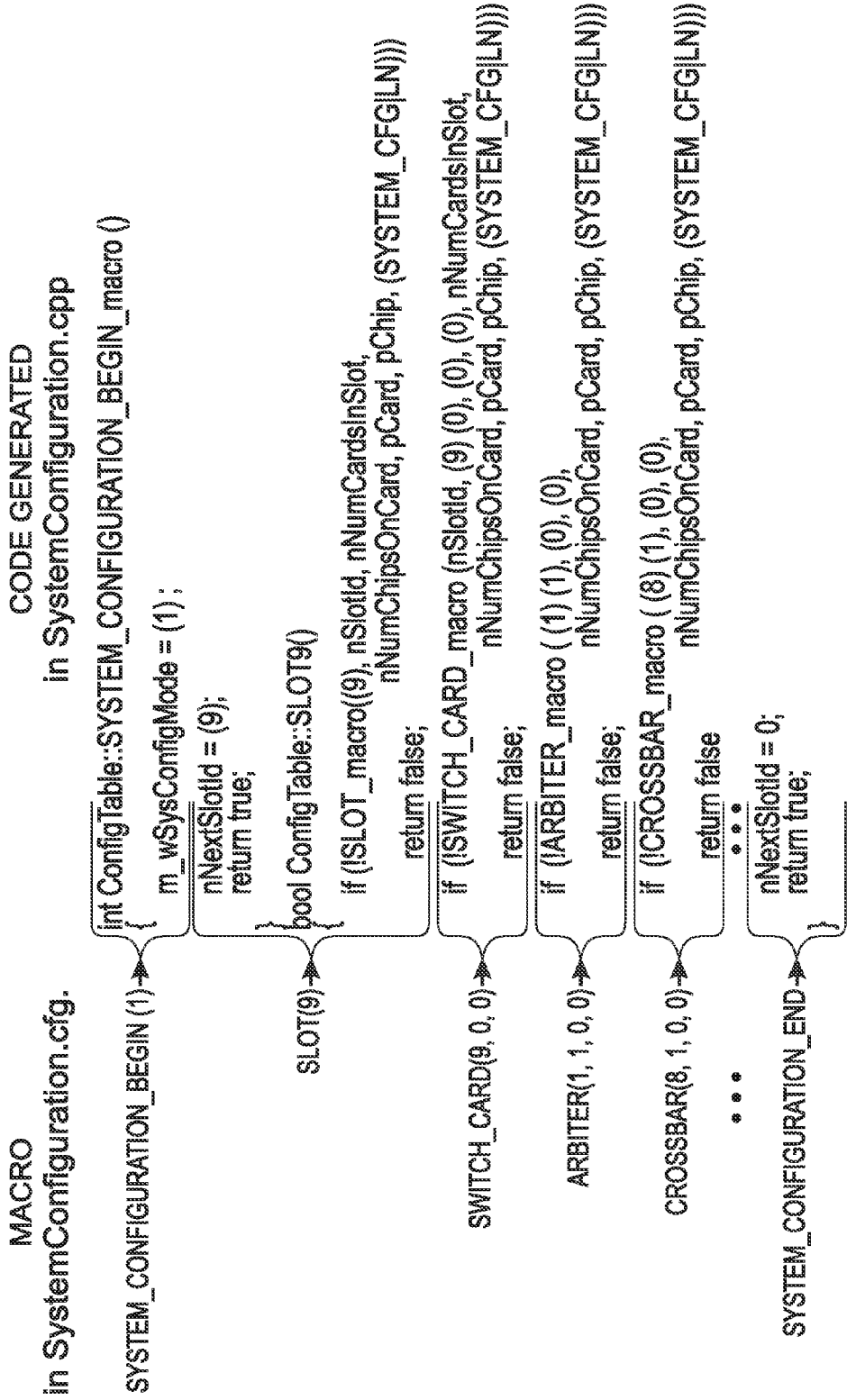
FIG. 5 is an illustration of code that is generated for each macro in the Systemconfiguration.cfg file.

FIG. 5 is an illustration of code that is generated for each macro in the Systemconfiguration.cfg file. The left side of the page shows the macro lines in the SystemConfiguration.cfg file, and the right side shows the code that gets generated in SystemConfiguration.cpp (actually, System Configuration.cfg is included at the System Configuration.cpp source file, but broken out as a separate file for clarity).

Data for the Configuration Table is accumulated from the header files listed below:

SystemConfiguration.cfg: as described above, provides the initial overall slot layout that defines which card type occupies what slot and what chips are configured on each card. The macros in this file are expanded into code by the compiler to make up methods in the ConfigTable object. At startup, these methods verify the hardware configuration, and read values from the tables described below, to program the Cyclone chips on the cards that are found.

The System Configuration file "SystemConfiguration.cfg" is modified by the system designer at build time to reflect the hardware layout of the Cyclone fabric. The contents are used at compile time to generate methods that make up the Configuration Table object, which is instantiated at run time to verify the hardware configuration and to pro-gram default values into the chips. The configuration information and the class methods that operate upon this information are included in the boot image that is present in the persistent store of the primary switch card (either hard disk, or some type of EPROM). A configuration table can also be downloaded to the primary card from the host during startup.

For each chip, in addition to the chip ID, there are three "modes" which are numbers that point to a section in the register tables. For each chip type there is a set of four register tables. The first table is simply a base table that contains an initial value for each register. The other three tables contain the mode specific values, and these tables are used to modify the base tables at runtime (i.e. the relevant entries in the mode tables are merged with the base tables). At runtime, the firmware starts with a copy of the base tables and successively merges in the appropriate entries from the other tables. The final result is programmed in the chips. The following header files contain tables that are hierarchical, with the first configuration file having the broadest scope for a particular chip type, and successive files having more resolution into the settings of individual chips.

ScBaseRegs_<chip_type>.h provide default settings for all chips of chip_type. These files are loaded first, and define the list of base or default registers settings for all the registers for a chip-type. All tables loaded after this are intended to be changes to this base configuration.

ScSysConfigRegs_<chip_type>.h provide the system level configuration modes per chip type. These files define the register settings based on a predefined system configuration. A chip's system configuration table has a number of modes that can be selected based on the system platform.

ScChipConfigRegs_<chip_type>.h provide the chip level configuration modes. These files define the register settings for individual chips of a particular chip-type within the system. The assignment of chip configuration modes within this table is intended to vary among chips of the same chip-type within a system according to system location.

ScCustomPrefRegs_<chip_type>.h provide custom chip level configuration modes. These files are used to define specific register settings that need to be modified from previously loaded tables. CustomPrefRegs_<chip-type>.h files define the tables of register settings that differ or that are not set in the base, system configuration, or chip configuration tables. These files provide the proper mechanism of adding or overriding register settings specified by the base, system configuration, or chip configuration tables.

Figure 6:
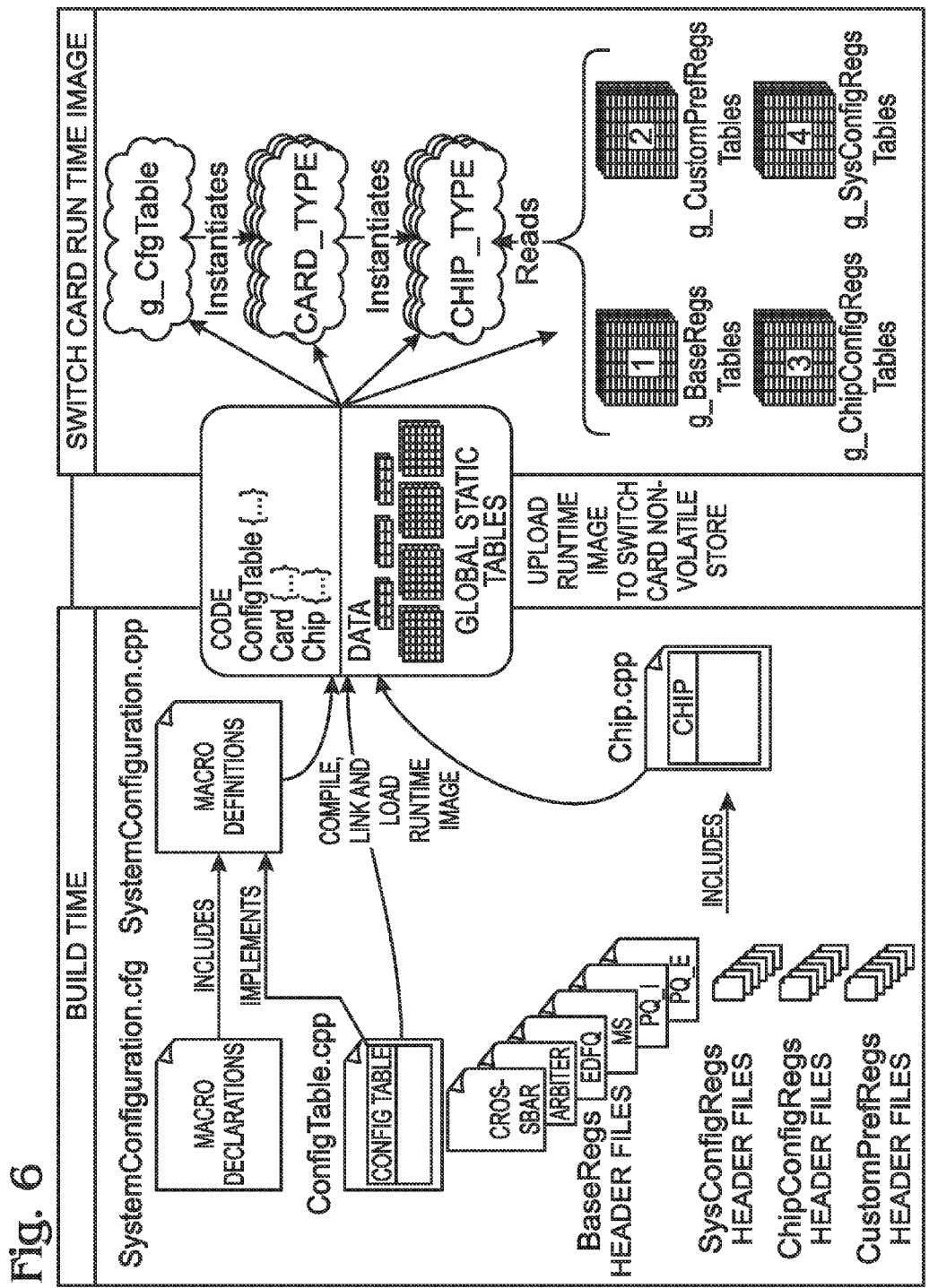
FIG. 6 illustrates the relationship between configuration files and configuration tables.

FIG. 6 illustrates the relationship between configuration files and configuration tables.

Self-Healing and Load Balancing

Self healing is a process by which the firmware dynamically changes system configurations to overcome system failures. Once corrected, the system brings itself back to a new "standard" of performance. In performing self healing, the firmware monitors the health of control and data links between switch chips and dynamically re-routes data and control information when links fail, in order to maintain optimum performance levels. Data and control traffic loading is also re-balanced when cards are inserted or removed from the system. Multiple levels of control performance is supported if the number of control links limits credit bandwidth, automatically switching to dual-credit mode to preserve credit bandwidth. The mode changes are the result of selecting different mode tables and re-programming the chip registers with values from those tables.

One aspect of Self Healing is Load Balancing. In the example system of the Cyclone Switch Fabric, Load Balancing would equally balance the "load" of port cards being configured and monitored by a processor on a switch card. Each such processor, through its dedicated Arbiter, can supervise up to 32 port cards. But if there are four working switch cards in the system, each processor would supervise 8 port cards in a load-balanced system. If one switch card were then to fail, the self healing firmware would detect this failure, and a load balancing routine might reallocate ports to switch cards such that 11 port cards are each supervised by switch cards 1 and 2, and the remaining 10 port cards are supervised by switch card 3.

Overview of the Cyclone Firmware Relating to Load Balancing

The Cyclone firmware is a collection of task objects that execute on the switch card CPUs. Communicating through a TCP/IP connection, the Cyclone firmware can be controlled by any host processor through a supplied Application Programming Interface (API). Configurable entirely through the use of configuration files, the Cyclone firmware is a distributed system providing fault-tolerant control of up to 16 switch cards and 32 port cards to program, monitor and control the Cyclone chips in a Cyclone switch fabric system. Typically, a switching subsystem contains multiple, intelligent switch cards that are connected through an internal network in a loosely coupled fashion.

A Cyclone Switch Subsystem (CSS) is generally distributed among the port cards and the switch cards. The port cards contain input and output queue chips (8505 iPQ and oPQ, 8805 EDFQ) and memory subsystem chips (8905 iMS and eMS). The switch cards contain an Arbiter (8605) and up to five Crossbar chips (Arbiters and Crossbars are both 8605 parts but are configured by a jumper to operate in either Arbiter or Crossbar mode). Included in the CSS is a controlling CPU that is resident on every switch card.

Overview of the Cyclone Firmware Relating to Self Healing

The firmware provides the capability to resynchronize individual credit counters in the PQ chips on a periodic basis, or on-demand in case errors are detected by the firmware. The firmware will re-synchronize the appropriate flow control counters of those particular ports for which an error was detected. Typically, credit resync is the result of detecting a status flag set by the S8605 Arbiter chip, indicating either a soft or permanent link error, or by the system detecting that a switch card has failed. If a credit-carrying control link goes down, the link will be re-assigned and the credit counters resynchronized.

The failure of a control link between an Arbiter and PQ indicates to the firmware that backplane tokens cannot be reliably communicated over the failed link The port card may need to be managed by a different switch card in order to re-establish connectivity to the chips on the port card. Once the self healing is complete, the BP_CBFC configuration of the switch may need to be updated. To update the BP_CBFC configuration, the register settings of the appropriate Arbiter chips must be updated, followed by those on the MS chips, and ultimately those on the PQ chips. Reconfiguration of the control links is performed by selecting an appropriate map from the PQ chip configuration file.

Example of Self-Healing Configuration Table Entry

FIG. 7 depicts an excerpt of a PQ chip configuration file. In response to changing hardware conditions, e.g., a control link failure or a swapped-out switch card, the firmware will scan its configuration tables in the file ScChipConfigRegs_PQ_I.h to determine the next best-fit credit resync configuration. The configuration file contains register settings for the different Cyclone configurations. The "mode" field is used to index into the configuration file to select register maps for a given mode. The mode field is made up of subfields that include credit mode and credit mask settings.

The "Chip Configuration Mode" is used as an index into the configuration tables to select the appropriate tables containing the chip register values for a given Chip Configuration Mode. The "Family Mask" defines alternate configurations to support load balancing and self healing. Family Mask is combined with Chip Configuration Mode to find compatible modes for alternate credit transmission/reception. The search is done in the order that the various configurations occur in the configuration file, with the most optimal configurations occurring first, followed by less optimal configurations. At some point the number of links becomes small enough to change the credit mode to "dual" mode, so that each credit returned to an iPQ is counted as two credits, to halve the number of credits that are needed to keep the switch running.

Figure 8A:
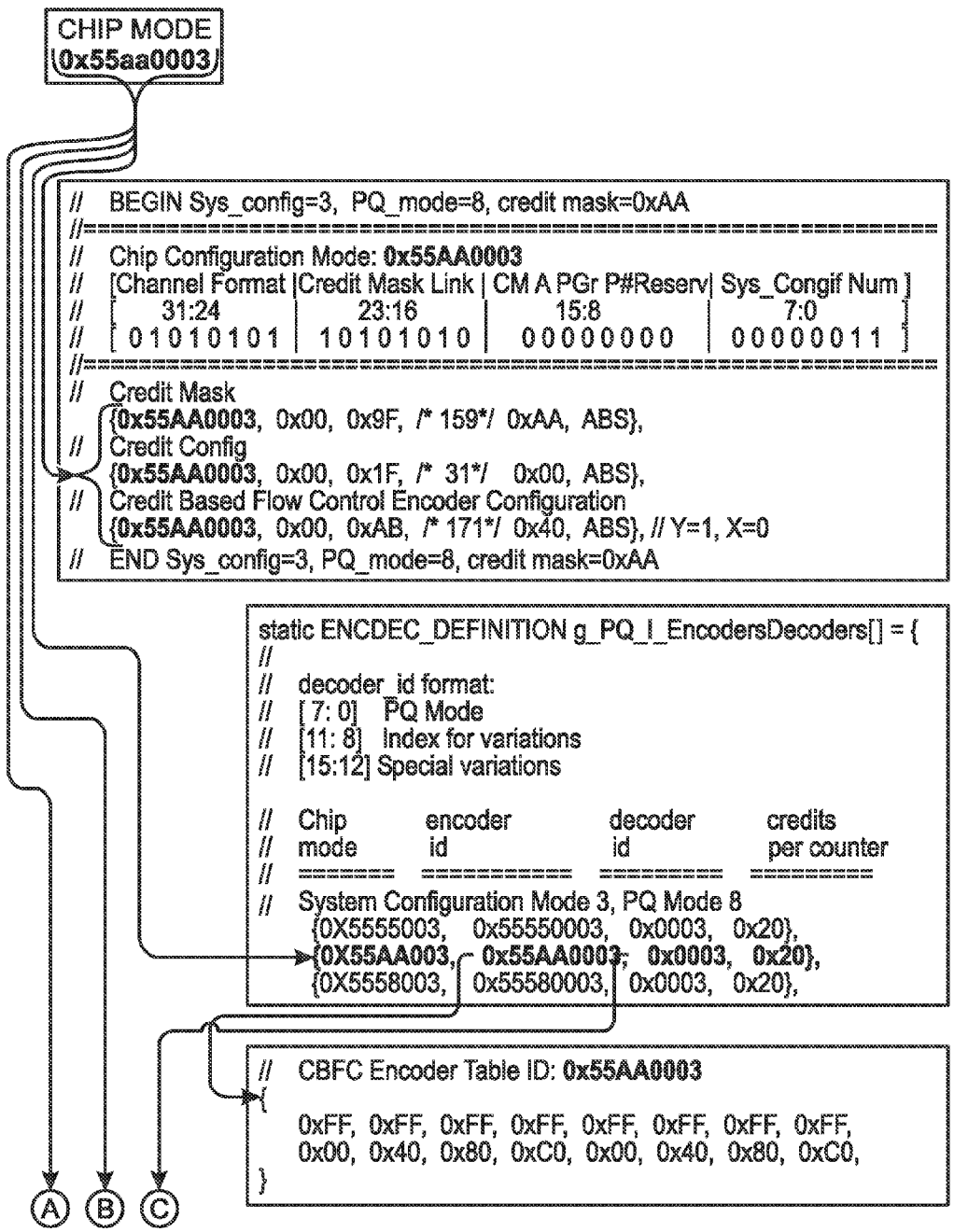
FIG. 8 illustrates how the configuration file is indexed, to locate the tables that contain the values to program into the chip registers for a given chip configuration mode.

FIG. 8 illustrates how the configuration file is indexed, to locate the tables that contain the values to program into the chip registers for a given chip configuration mode.

Link Failures

When the firmware detects a control or data link error during polling, it sends an internal system error message to the system error handler on the primary switch card. At the same time, an error message is sent to the user. The system error handler reconfigures the switch when it receives a control link failure error and, synchronizes the credit counters of all PQ's when it receives a data link failure error.

Control Link Failures

The failure of a control link between an Arbiter and PQ indicates to the firmware that tokens cannot be reliably communicated over the failed link. The port card may need to be managed by a different switch card in order to re-establish connectivity to the chips on the port card (this is referred to as self healing from the Firmware perspective, as opposed to load balancing from the switch's perspective, which balances cell traffic load among the available links). Once the load balancing is complete, the Credit Based Flow Control (CBFC) configuration of the switch may need to be updated. To update the CBFC configuration, the register settings of the appropriate Arbiter chips updated, followed by those on the MS chips, and ultimately those on the PQ chips.

The self healing Process does the following:
1. Disables polling.
2. Disables the configuration table access on all XbarCard tasks.
3. Distributes the available port cards among the running switch cards based on the available (error-free) Arbiter to PQ control links.
4. Re-enables access to the configuration table on all XBarCard tasks.
5. Distributes the register store based on the new port card distribution.
6. Computes and selects a new primary Arbiter chip and switch card.
7. Computes and selects a new primary PQ chip, port id and port card.
8. Computes the next CBFC configuration to use.
9. Disables CBFC.
10. Configures the Arbiter chips with the new CBFC configuration.
11. Configures the MS chips with the new CBFC configuration.
12. For each PQ chip, configures and enables the new CBFC configuration.
13. Distributes the updated register store to the switch cards.
14. Re-enables polling.

Data Link Failure from Ingress TM to Ingress MS

Data link failures are detected on the receive side of the ingress MS during register polling. The Host is notified of these failures. A data link failure detected on the receive side of the ingress MS indicates that there's an error on the data link between the traffic manager and the iMS. The firmware has a map of how the TM links map between the ingress MS and egress MS chips. Using this map, the system error handler will disable the data link in the eMS "Output Link Enable" bit mask that corresponds to the failed data link detected by the ingress MS.

Data Link Failures from Ingress MS to Crossbar

Data link failures are detected on the receive side of the Crossbar during register polling. The Host is notified of these failures. Each link is monitored for 8B/10B violations, frame misalignment, byte misalignment, loss of CDR lock, and FIFO overflow/underflow. When the link error threshold is exceeded for a link, the Crossbar will initiate a report to the Arbiter over the token bus. The result is that the Arbiter will no longer grant transmissions over that link. An idle cell is automatically generated by the Crossbar for those outputs that have no corresponding valid input. The errored link is detected during register polling and the Host is notified. Disabling a link reduces switch performance and should be cause for removal of the offending card(s).

Data Link Failure from Crossbar to Egress MS

Data link failures are detected on the receive side of the egress MS (from backplane or another MS) during register polling. The Host is notified of these failures. Failed backplane links between the Crossbar and receiving eMS are communicated to the iPQ on the same port card by the MS2PQ_LINK_FC signal, which communicates all receive link status in round robin order. Once the iPQ gets a failed link notification, it passes the information to the Arbiter during bids (byte-7, bit-1) so that the Arbiter will stop using that link to grant connections to the respective egress port and channel (and subchannel).

System Error Counter Timeout

The iPQ indicates a credit counter timeout "error" in bit 2 of its High Priority Message register (register 254). The error is detected by a polling task, which reports it to its local XbarCard task. This task does not report the error to the user nor to the system error handler task. Instead, the XBarCard task intercepts the error and sends the NOT_SYNCH_TIMED_OUT_COUNTERS message to the local CreditResync task. The local CreditResync task detects which specific counter or counters have timed out by reading the timed out counters bit mask from the iPQ. The CreditResync task resets each timed out counter to the maximum number of credits depending on the current CBFC mode.

A method has been provided for automatically generating code to define and control a system of hardware elements. A switch fabric embodiment of the invention has been presented for illustration. However, the invention is not limited to merely this example. Other variations and embodiments of the invention will occur to those skilled in the art.

We claim:

1. In a system of connected hardware elements, a method for automatically generating code to define and control the system, the method comprising:
   accepting a system configuration macro with sub-macros to define a hardware layout of the system of connected hardware elements, including defining system elements, subsystem elements, and connections there between;
   accepting a plurality of tables defining a plurality of system element behaviors, a plurality of subsystem element behaviors, and a plurality of connection options, wherein the plurality of tables include base tables that contain initial configuration values, and mode specific tables that contain mode specific configuration values;
   expanding a plurality of sub-macros with populated parameters;
   generating executable table indexing code;
   executing the executable table indexing code to:
      load the plurality of tables into corresponding subsystem element memories;
      modify the base tables by merging appropriate entries from the mode specific tables;
      access values from the modified base tables based on the populated parameters; and,
      program the system of connected hardware elements based on the values accessed from the modified base tables.

2. The method of claim 1 further comprising:
   selecting sub-macros;
   populating parameters in the selected sub-macros; and,
   wherein expanding a plurality of sub-macros with populated parameters includes expanding the parameters of the selected sub-macros.

3. The method of claim 2 further comprising:
   elaborating the executable code; and,
   accessing the tables in response to parameters in the executable code.

4. The method of claim 3 wherein elaborating the executable code includes differentiating the executable code into code sections corresponding to system and subsystem elements.

5. The method of claim 4 wherein accepting a system configuration macro with sub-macros for defining system elements, subsystem elements, and the connections there between, includes accepting a hierarchical set of fields, with subsystem elements being indentured to system elements; and,
   wherein accessing the tables in response to the parameters in the executable code includes:
      accessing a sub-table in response to indexing a table; and,
      loading values from the sub-table in chip registers.

6. The method of claim 5 further comprising:
generating the system configuration macro; and,
generating the tables.

7. The method of claim 4 wherein expanding the plurality of sub-macros with populated parameters includes generating C++ language code; and,
wherein generating executable code includes generating machine code.

8. The method of claim 4 wherein accepting a system configuration macro with sub-macros for defining system elements, subsystem elements, and the connections there between, includes accepting a switch fabric configuration macro for defining switch fabric cards, firmware processing integrated circuits (chips) on the cards, and the connections between the cards.

9. The method of claim 8 wherein accepting a switch fabric configuration macro with sub-macros for defining switch fabric cards, firmware processing chips on the cards, and the connections between the cards, includes accepting sub-macros to hierarchically define the system level (slot number), the slot level (card type), card level (chip type), and chip level (link types and endpoint).

10. The method of claim 9 wherein accepting sub-macros to hierarchically define the system level, the slot level, card level, and chip level, includes differentiating at the slot level between port cards to manage traffic flow in and out of the switch fabric, and switch cards to manage backplane traffic flow between the port cards.

11. The method of claim 10 wherein accepting sub-macros to hierarchically define the system level, the slot level, card level, and chip level, includes differentiating at the port card level between memory subsystems (MSs) and queuing/scheduling (QS) devices.

12. The method of claim 10 wherein accepting sub-macros to hierarchically define the system level, the slot level, card level, and chip level, includes differentiating at the switch card level between arbiter and crossbars.

13. The method of claim 11 wherein accepting sub-macros to hierarchically define the system level, the slot level, card level, and chip level, includes defining MS chip level data link connections.

14. The method of claim 13 wherein defining MS chip level data link connections includes defining input port card ingress data links, backplane data links, and output port card egress data links.

15. The method of claim 11 wherein accepting sub-macros to hierarchically define the system level, the slot level, card level, and chip level, includes defining priority queue (PQ) chip level control link connections.

16. The method of claim 15 wherein defining PQ chip level control link connections includes defining grant/bid control links between input port card ingress QS devices and switch card arbiters and defining grant/bid control links between output port card ingress QS devices and switch card arbiters.

17. The method of claim 9 wherein accepting sub-macros includes defining the chip level; and,
wherein accessing the tables in response to parameters in the executable code includes accessing tables to define chip default register settings and chip modes.

18. The method of claim 4 further comprising:
following the elaboration of the executable code, monitoring system performance;
comparing the system performance to a standard;
in response to sub-standard system performance:
automatically repopulating selected parameters in the selected sub-macros;
accessing tables in response to the repopulated parameters; and,
instantiating new executable code.

19. In a switch fabric of connected cards, a method for automatically generating code to define and control the switch fabric, the method comprising:
accepting a system configuration macro with sub-macros to define a hardware layout of the switch fabric, including defining switch cards, port cards, integrated circuits (chips) on the cards, and the connections there between;
accepting a plurality of tables defining a plurality of card behaviors, a plurality of chip behaviors, and a plurality of connection options, wherein the plurality of tables include base tables that contain initial configuration values, and mode specific tables that contain mode specific configuration values;
selecting sub-macros;
populating parameters in the selected sub-macros;
expanding the selected sub-macros;
generating executable table indexing code;
executing the executable table indexing code to:
load the plurality of tables into corresponding card chip memories;
modify the base tables by merging appropriate entries from the mode specific tables;
access values from the modified base tables based on the populated parameters; and,
program the switch fabric based on the values accessed from the modified base tables.

20. The method of claim 19 further comprising:
prior to indexing the tables, elaborating the executable code.

21. The method of claim 20 wherein elaborating the executable code includes differentiating the executable code into code sections corresponding to cards and chips.

22. The method of claim 21 further comprising:
following the elaboration of the switch fabric with the executable code, monitoring switch fabric performance;
comparing the switch fabric performance to a standard;
in response to sub-standard switch fabric performance:
automatically repopulating selected parameters in the selected sub-macros;
indexing tables in response to the repopulated parameters; and,
instantiating new executable code.

23. In a system of connected hardware elements, a method for automatically generating code to define and control the system, the method comprising:
accepting a system configuration macro with sub-macros to define a hardware layout of the system of connected hardware elements, including defining system elements, subsystem elements, and connections there between;
accepting a plurality of tables with a plurality of system element behaviors, a plurality of subsystem element behaviors, and a plurality of connection options, wherein the plurality of tables include base tables that contain initial configuration values, and mode specific tables that contain mode specific configuration values;
defining the system of connected elements in response to selecting sub-macros;
populating parameters in the selected sub-macros;
defining physical links between the system elements and the behavior of the system and subsystem elements in response to populating the selected sub-macro parameters;
expanding the selected sub-macros;
generating executable table indexing code;

executing the executable table indexing code to:
   load the plurality of tables into corresponding subsystem element memories;
   modify the base tables by merging appropriate entries from the mode specific tables;
   access values from the modified base tables based on the populated parameters; and,
   program the system of connected hardware elements based on the values accessed from the modified base tables.

24. A method for autonomously discovering the configuration of a system of connected hardware elements, the method comprising:
   initially populating parameters in a macro, wherein the macro defines a hardware layout of the system of connected hardware elements, including defining system elements, subsystem elements, and connections there between;
   elaborating table indexing executable code;
   executing the executable table indexing code to:
      load a plurality of tables into corresponding subsystem element memories, wherein the plurality of tables define a plurality of system element behaviors, a plurality of subsystem element behaviors, and a plurality of connection options, and wherein the plurality of tables include base tables that contain initial configuration values, and mode specific tables that contain mode specific configuration values;
      modify the base tables by merging appropriate entries from the mode specific tables;
      access values from the modified base tables based on the populated parameters;
      program the system of hardware elements based on the values accessed from the modified base tables;
      monitor the performance of the system of hardware elements;
      compare the system performance to a standard;
         in response to sub-standard system performance:
            automatically repopulating parameters in the macro;
            access new values from the modified base tables based on the repopulated parameters; and,
            reprogram the system of hardware elements based on the new values.

25. The method of claim 24 wherein initially populating parameters in a macro includes populating the macro with default parameters.

\* \* \* \* \*